No. 739,671. PATENTED SEPT. 22, 1903.
C. A. HANNAN.
SUPPORT FOR ELECTRIC FIXTURES.
APPLICATION FILED MAY 6, 1902.
NO MODEL.

WITNESSES:

INVENTOR
Charles A. Hannan
BY
ATTORNEYS.

No. 739,671. Patented September 22, 1903.

UNITED STATES PATENT OFFICE.

CHARLES ARTHUR HANNAN, OF NEW YORK, N. Y.

SUPPORT FOR ELECTRIC FIXTURES.

SPECIFICATION forming part of Letters Patent No. 739,671, dated September 22, 1903.

Application filed May 6, 1902. Serial No. 106,175. (No model.)

*To all whom it may concern:*

Be it known that I, CHARLES ARTHUR HANNAN, a citizen of the United States, residing in the city of New York, (borough of Manhattan,) in the county and State of New York, have invented a new and useful Support for Electric Fixtures, of which the following is a full, clear, and exact description.

My invention relates to improvements in supports for electric fixtures, the same being essentially adapted to carry and support an electrolier from the electric conduit system of a building in a rigid and substantial manner, the improvement tending to materially simplify the existing methods of installation and permitting a better mechanical construction to be secured at a considerable saving in cost.

My improvements are applicable only to straight electric outlets, and the same form essentially a part of the conduit system of a building, said improvements being installed without regard to fixtures other than that they are straight electric fixtures and have no gas attachment.

In the installation of electric fixtures in houses, buildings, &c., the time and labor of workmen are consumed in making the fittings and drawing the wire or wires through the parts, and in many cases the conditions of the work require the use of special parts, particularly where the fixtures are heavy and quite large conductors are used.

My improved hanger can be employed in connection with heavy and light fixtures, and a special point of merit is that the conductor can be drawn through the hanger with ease and despatch.

With these ends in view the invention consists of a support or hanger for electric fixtures embodying certain novel features of construction, as will be hereinafter fully described, and the actual scope of the invention will be defined by the claims.

Reference is to be had to the accompanying drawings, forming a part of this specification, in which similar characters of reference indicate corresponding parts in all the figures.

Figure 1:
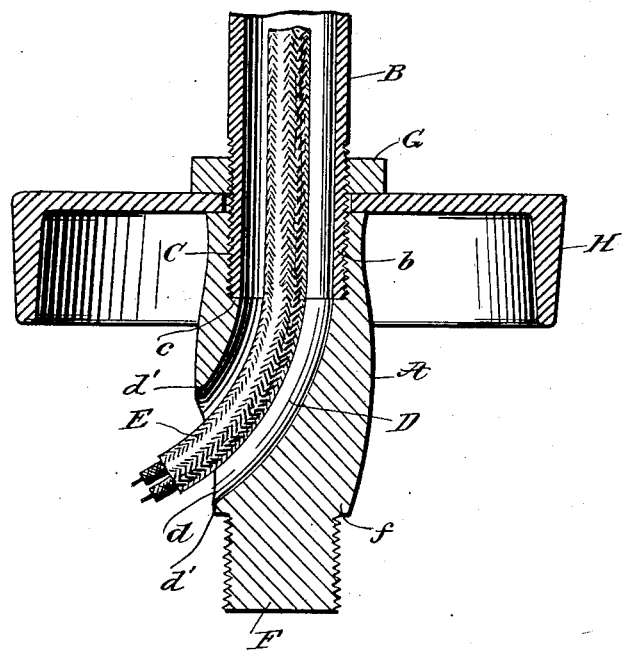
Figure 2:
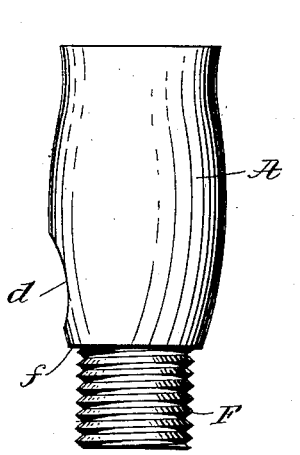
Figure 3:
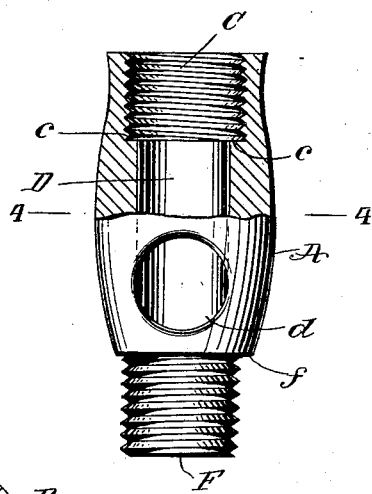
Figure 4:
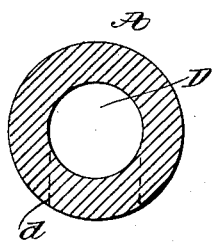

Figure 1 is a sectional elevation of a support or hanger for electric fixtures embodying my invention and shown in operative relation to an ordinary metallic conduit, a junction-box, and an electric conductor. Fig. 2 is a side elevation of the hanger detached from the parts with which it coacts. Fig. 3 is a view, partly in side elevation and partly in section, looking at the left-hand side of Fig. 2; and Fig. 4 is a transverse section in the plane of the dotted line 4 4 of Fig. 3.

My improved support or hanger consists of a metallic body A, having any suitable or appropriate form and provided at one end with means for attachment to an electric conduit, while its other end is fashioned for the application of any desired electric fixture, said body being also provided with a passage which opens laterally at a point intermediate of the length of the hanger. As shown by the drawings, the body is circular in cross-section and of slightly-bulging form in the direction of its length; but it will be understood that the shape is immaterial. This body of the support or hanger is provided with threaded extremities adapted for application to a conduit B and for the attachment of the fixture, respectively, and, as shown by Figs. 1 and 3, the thread at the upper part or end of the hanger is an internal or female thread, (indicated at C.) This female thread is run continuously in the bore of the hanger for a suitable length, and it terminates in an abrupt ledge or shoulder $c$, the diameter of said ledge or shoulder being less than that of the threaded part or socket C. The internal thread at the upper end of the hanger enables the latter to be screwed on the threaded lower part $b$ of an ordinary metallic electric conduit B, heretofore referred to, and the extremity of said electric conduit is adapted to bottom or impinge against this contracted shoulder or ledge $c$ of the hanger, thereby making a flush joint between the inner surface of the conduit B and the wall of the passage D, which is provided in the body of the hanger or support. This passage D of the hanger extends from the shoulder or ledge $c$ at the bottom of the threaded socket C to a point in one face or side of the hanger A. Said passage D may extend lengthwise of the hanger for any suitable distance; but it is essential that the lower part of this passage shall be carried in a curved or inclined direction in order that it may terminate in an opening $d$, which is provided in one face or side of the hanger at a point above the lower extremity thereof. The passage D has smooth surfaces or walls, and the lateral opening $d$ is bounded by a smooth wall or edge in order that an electric conductor E may easily be drawn or passed through the hanger.

As hereinbefore indicated, the hanger is provided with means for the application of an electric fixture, and in the embodiment of the invention shown by the drawings the hanger is reduced at its lower end, so as to provide a stud F, the latter being integral with the body, as shown by Fig. 1, and having an external or male thread cut thereon. The formation of the solid stud of reduced size as compared with the body provides a shoulder $f$ between the threaded face of the stud and the body A, and a fixture of any suitable character may be screwed on this stud until the fixture abuts against this shoulder $f$, thereby limiting the rotary movement of the fixture in connecting it to the threaded stud of the hanger.

By reference to Fig. 3 of the drawings it will be seen that the passage D terminates at its upper end in the shoulder $c$ at the bottom of the female-threaded socket C of the hanger, while the lower end of this passage terminates in the opening $d$, which is located above the solid threaded stud F of said hanger. It is evident that an electric conductor E can easily be passed or drawn from the electric conduit B through the passage D and emerge from the hanger through the lateral opening $d$ of said passage D. In the operation of drawing or passing the conductor through the hanger the wires of the conductor cannot strike or lodge against any part of the passage of the hanger, because the wall of the passage D is in flush relation to the inner surface of the conduit B, and, furthermore, the passage is curved or inclined in such a way that the conductor or its wires may easily emerge from the hanger through the opening $d$ of said passage, which is bounded by smooth edges for the purpose of facilitating the operation of drawing or passing the conductor through the hanger.

In applying the improved support or hanger to the ordinary parts it is my purpose to have the workman run or cut a long male thread $b$ on the lower part of the electric conduit. A lock-nut G is then screwed on this threaded part of the conduit, after which the usual junction-box H is slipped on the threaded end $b$ of the conduit, and finally the hanger A is screwed on said end of the conduit. The threaded part or socket C of the hanger has direct engagement with the threaded part $b$ of the conduit, and the upper end of this hanger is adapted to impinge the junction-box H, whereby the hanger is attached firmly and in a direct manner to the conduit B, and said hanger is made to coact with the lock-nut G in clamping the junction-box directly to said conduit, the hanger thus serving the purpose of an ordinary lock-nut. The electrical conductor E, as before indicated, may be drawn or passed with ease and despatch from the conduit through the passage D and the opening $d$ of the hanger, and the electric fixture can now easily be screwed to the threaded stud F of said hanger.

In the practical construction of the hanger the edges of the orifice or opening $d$ at the lower terminal of the passage D are rounded or beveled, as at $d'$, in order to minimize chafing or abrasion of the conductor-covering during the operation of drawing or passing the conductor through the hanger, thus making the hanger meet the requirements of fire underwriters.

Having thus described my invention, I claim as new and desire to secure by Letters Patent—

1. The combination with a junction-box, and a conduit-pipe extended into said box, of a fixture-hanger screwed to said conduit-pipe and impinging directly against the box, said hanger being provided with a longitudinal conductor-passage which at one end is extended laterally through one side of the hanger and at the other end is in communication with the conductor-pipe, and a lock-nut screwed to the conductor-pipe and coöperating with the box and the hanger in securing the parts fixedly in position.

2. The combination with a junction-box, and a conduit-pipe, of a fixture-hanger provided at one end with a male-threaded stud and also provided with an axial conductor-passage which terminates in a female-threaded opening at one end and is extended laterally through the hanger at a point above the threaded stud thereof, said hanger being screwed to the conduit-pipe and impinging against the junction-box.

3. The combination with a junction-box, and a conduit-pipe extended into the box, of a fixture-hanger provided at its lower end with a male-threaded stud and also provided with a conductor-passage which is curved or inclined laterally and opens by an orifice through one side of the hanger at a point above the stud, the edges of said orifice being rounded, the upper end of said hanger being provided with a female thread adapted to engage the conduit-pipe, and the hanger being arranged to impinge the junction-box, and a lock-nut screwed on the conduit-pipe and coöperating with the box and the hanger in securing the parts fixedly in place.

In testimony whereof I have signed my name to this specification in the presence of two subscribing witnesses.

CHARLES ARTHUR HANNAN.

Witnesses:
W. H. TILDEN,
JOHN N. WINECK.